July 7, 1931. F. J. KUBLER 1,813,499
AUTOMOBILE BODY
Filed Sept. 22, 1928
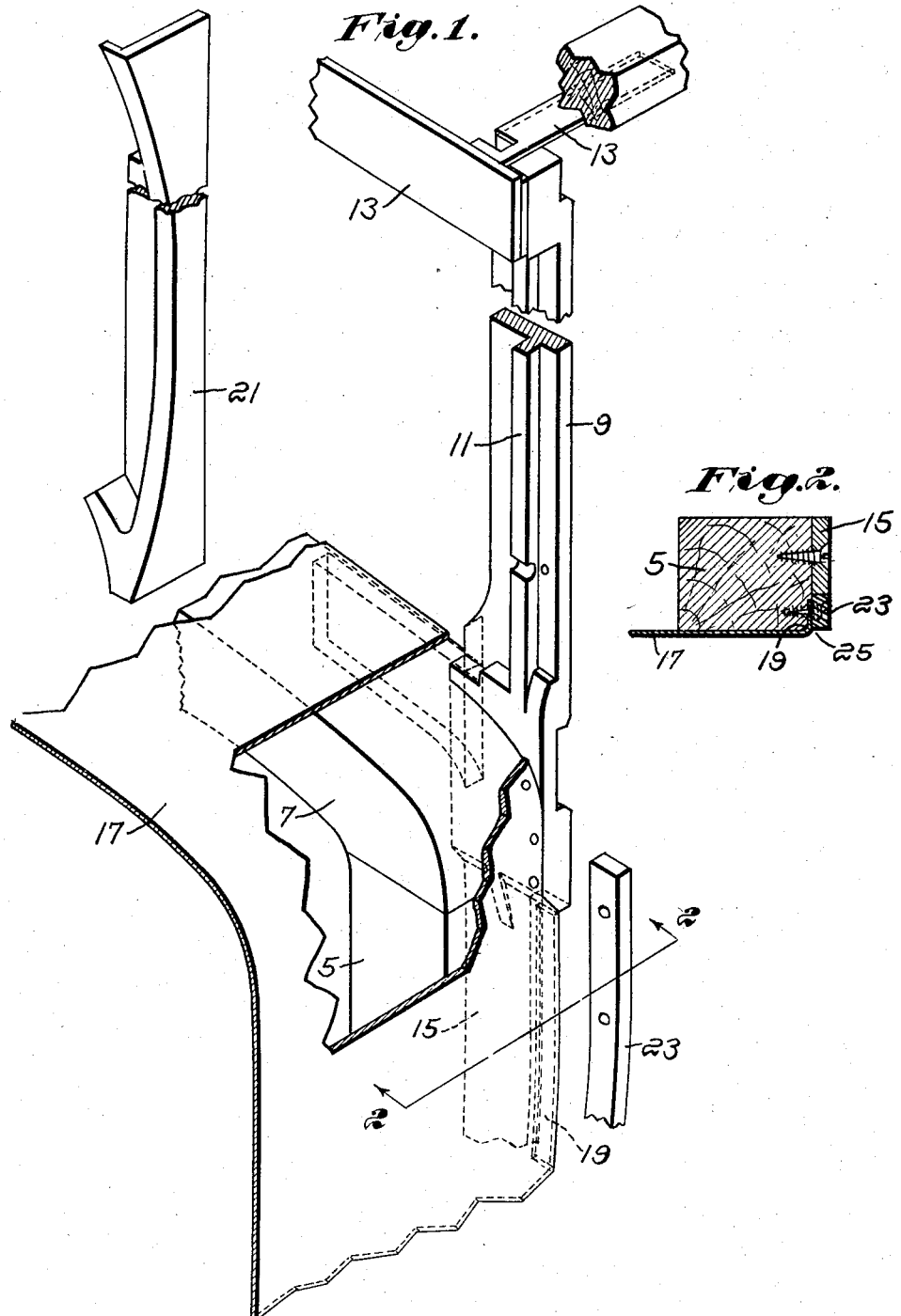
Inventor:
Frederick J. Kubler,
by Emery, Booth, Janney Varney
Attys.

Patented July 7, 1931

1,813,499

UNITED STATES PATENT OFFICE

FREDERICK J. KUBLER, OF NEW YORK, N. Y., ASSIGNOR TO A. S. CAMPBELL COMPANY, OF EAST BOSTON, MASSACHUSETTS, A CORPORATION OF MASSACHUSETTS

AUTOMOBILE BODY

Application filed September 22, 1928. Serial No. 307,690.

This invention relates to automobile bodies and the object is to provide an improved structure for the same which facilitates securing in position a body panel which lies adjacent a door opening defined by a body pillar rising above the belt line, at least the projecting portion of such pillar being of metal construction.

The invention finds a particular application in the case of a cowl panel, and by way of example I have herein illustrated such application and will describe it in detail in the appended description.

In the drawings:—

Fig. 1 is a fragmentary broken-away perspective view of a partly completed automobile body, the left hand or nigh forward corner being shown, with certain separable parts displaced from the position which they occupy in the completed structure; and Fig. 2 is a section of the completed structure on the plane of the line 2—2 of Fig. 1.

In the drawings I have shown the forward corner of a vehicle (at the usual location of the windshield) in which the forward posts or pillars rising above the belt line are of metallic construction. Herein the body as a whole is of composite construction and is provided with a wooden framework at the cowl comprising an upright 5 at either side connected by a cowl bar 7. Secured to the rear face of the upright 5 below the belt is the main body portion of the top supporting pillar which is formed of suitable metal, as, for example, a forging, and comprises a general web-like section 9 disposed as a whole rearwardly of the rear face of the framework, but which may be provided with suitable stiffening flanges, as, for example, 11 herein shown. The design may desirably be such that the flanges may have various utilitarian functions in addition to reinforcement. The web 9 is secured to the roof of the vehicle by suitable anchoring arms 13 and the lower portion 15 which lies against the rear face of the upright 5 is, as best shown in Fig. 2, of substantially web-like form and its outer edge is spaced inwardly from the rear outer corner of the upright 5.

The body may be framed, conveniently by means of a suitable jig, and the pillar 9 permanently secured in its final position. The body is then ready for the application of the cowl panel 17. This is fitted into position, in the present example around the framework formed by the uprights 5 and cowl bar 7, and the edge may be pressed or swaged down and nailed to the bar 7 at the front of the pillar section 9 and the sides of the panel flanged over on the rear face of the uprights 5, as shown in dotted lines at 19 in Fig. 1, the edge being received as seen in Fig. 2 in the rabbet which the attaching portion 15 of the metallic pillar element defines with the rear face of the upright 5. This flanged over edge 19 is preferably nailed to the wooden member.

After the cowl panel has thus been fitted into place, the edge thereof which is presented to the front of the web of the pillar body 9 may be covered by a removable finishing piece 21 secured against the forward face of said body member 9 this being the face having the flange 11 and completing the contour of the upper section of the pillar, that is, the part projecting above the belt. In the example of the invention shown the lower end of the member 21 overlies the cowl panel 17 and cowl bar 7 directly in front of the body member. The edge of the cowl panel at the rear of the upright 5 may be covered by a metallic member 23 applied over the same and screwed to the upright 5. This member 23, as best shown in Fig. 2, is adapted substantially to fill the rabbet referred to, which is defined by the section 15 and the rear face of the upright, but preferably does not extend to the exterior face of the body, but terminates inwardly thereof to provide a rabbet 25 to receive a door overlap flange.

The member 23, as clearly shown in Fig. 2, is adapted to mate with the adjacent portion 15 of the pillar member and the rear faces of this portion and of the member 23 constitute a jamb face for the door frame at the door joint.

The construction just described is an example of the provision of suitable means for securing the edge of a body panel to a wooden frame in connection wth a body pillar element of metallic construction. The process of construction is simple and the resulting job is of seemly and workmanlike appearance. It will be noted that the roof supporting pillar may be framed in the job permanently and thereafter the panel fitted into place and the job completed with the handling of only small and easily attached pieces, and that the solidity and accuracy of the framing job as a whole are not impaired even temporarily during the operations of securing the panel.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

Claims:

1. A vehicle body having a wooden framing member at the cowl, a metallic top-supporting pillar comprising a web-like portion attached to the rear side of said framing inwardly of the outer side thereof and projecting above the same to the roof, a cowl panel having its edges shaped about said framing and separable pieces cooperating with said web-like portion respectively to provide a jamb face below the belt and to complete the contour of the upper portion of the pillar and overlying the edges of said panel adjacent said member.

2. In a vehicle body a metallic top-supporting pillar extending from the roof to below the belt line, a woden member associated therewith below the belt line and projecting outwardly of the same, a panel having its edge flanged about the projecting portion of said member, and a removable covering strip overlying said edge and cooperating with the adjacent part of said pillar to provide a jamb face.

3. In a vehicle body a wooden upright at a side of a door opening, a metallic top-supporting pillar having a portion extending over said upright at the side toward the door and secured thereto in spaced relation to the outer face of said upright, a body panel having its edge flanged around said upright and a removable covering strip overlying said edge and cooperating with said portion to provide a jamb face.

4. A vehicle body having a wooden frame member at the cowl below the belt, a metallic top supporting pillar having a web-like lower portion lapping on and secured to the rear face of said frame member but in spaced relation to the rear outer corner thereof, a cowl panel having its edge flanged over said corner onto said face and a piece secured over said edge and mating with said web-like portion to provide a jamb face.

In testimony whereof, I have signed my name to this specification.

FREDERICK J. KUBLER.